(12) United States Patent
Hashizume et al.

(10) Patent No.: US 7,113,359 B2
(45) Date of Patent: Sep. 26, 2006

(54) IMPEDANCE-CONTROLLED WRITE DRIVER FOR LOW POWER PREAMP

(75) Inventors: Motomu Hashizume, Tokyo (JP); Naoko Jinguji, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 6 days.

(21) Appl. No.: 10/731,252

(22) Filed: Dec. 9, 2003

(65) Prior Publication Data

US 2005/0122613 A1 Jun. 9, 2005

(51) Int. Cl.
*G11B 5/02* (2006.01)
(52) U.S. Cl. .......................... 360/68; 360/46; 327/110
(58) Field of Classification Search ..................... None
See application file for complete search history.

(56) References Cited

U.S. PATENT DOCUMENTS

| | | | |
|---|---|---|---|
| 6,674,595 B1* | 1/2004 | Chiou et al. ................... | 360/67 |
| 6,879,455 B1* | 4/2005 | Ngo et al. ..................... | 360/68 |
| 6,917,484 B1* | 7/2005 | Ranmuthu ..................... | 360/46 |
| 6,947,239 B1* | 9/2005 | Takahashi ..................... | 360/68 |
| 6,970,316 B1* | 11/2005 | Venca et al. ................... | 360/61 |
| 7,006,313 B1* | 2/2006 | Ngo ............................ | 360/46 |
| 2002/0118479 A1* | 8/2002 | Yoshizawa et al. ........... | 360/67 |
| 2003/0103296 A1* | 6/2003 | Jang et al. ................ | 360/265.9 |

* cited by examiner

*Primary Examiner*—Andrea Wellington
*Assistant Examiner*—Dan I Davidson
(74) *Attorney, Agent, or Firm*—W. James Brady, III; Frederick J. Telecky, Jr.

(57) ABSTRACT

Disclosed are methods and circuits for impedance-controlled write drivers using matched impedance control circuits coupled in parallel with a magnetic write head.

8 Claims, 3 Drawing Sheets

IMPEDANCE-CONTROLLED WRITE DRIVER FOR LOW POWER PREAMP

TECHNICAL FIELD

The invention relates to hard disk drive assemblies. More particularly, the invention relates to methods and apparatus for impedance control in write head driver circuitry.

BACKGROUND OF THE INVENTION

For high performance hard disk drive assemblies, very fast rising and falling times and precise impedance control are required in order to maximize the performance of write drivers. Low power supply voltage is generally preferred to avoid potential problems with excessive power consumption and heat dissipation. Conventional series-type impedance control circuits have problems including, but not limited to, power supply voltage, or "headroom" degradation due to a voltage drop over matching resistors placed in series. In addition, write current tolerance is limited by the inevitable variation in the impedance of internal series resistors.

Another challenge faced by series-connected impedance control circuits known in the arts is their response to changes in the write current. The write current naturally tends to be dependent upon the write head impedance. Referring to the representative prior art circuit shown in FIG. 1, write current $I_W$ that flows into the write head is determined by the ratio of the internal reference resistance $R_o$ and the external write-head-impedance $(R_h+R_{fpc})$. Because of this, write-current is dependent on not only the inherent variations present in the internal resistance, but also on the write-head-impedance. Increasing the internal reference resistor $R_o$ decreases the write current's dependency on the write-head-impedance, but detrimentally increases the voltage $V_h$ drop across the write head.

Swing voltage asymmetry is another problem faced by write driver circuits known in the arts. Asymmetric swings in head voltage can result in loss of stored data and damage to the heads. Typically between a preamp and a recording head (i.e. write head), and a reading head (not shown) there are wires or lines for both writing and reading. Due to area constraints, the lines are typically closely spaced, e.g. on the order of about 50–100 um, making them susceptible to "write-to-read coupling" or "crosstalk" resulting from mutual interference. The swing voltage of the write lines can be very fast and large in magnitude, sometimes causing damage to the heads through capacitive and/or inductive coupling between the write lines and read lines.

These and other problems encountered by prior art conventional write driver circuitry, such as that represented by the example shown in FIG. 1, make it difficult to provide both current-accuracy and high-performance while also using a low voltage power supply. It would be useful and desirable in the arts to provide improved impedance-controlled write driver apparatus and methods. It would be advantageous to provide a reliable and accurate impedance-controlled write driver circuit for use with a low voltage power supply. Advantages would also be obtained by avoiding the reduction of headroom and making head voltage swings symmetrical.

SUMMARY OF THE INVENTION

In carrying out the principles of the present invention, in accordance with preferred embodiments thereof, methods and apparatus are provided for impedance-controlled write drivers.

According to one aspect of the invention, a method of coupling a magnetic read/write head to a driver current source is provided. Steps include coupling a read/write head to a flexible printed circuit containing read lines and write lines. The flexible printed circuit has two opposing terminals wherein each is coupled to one of two approximately matched impedance control circuits in parallel with the current source.

According to another aspect of the invention, a method of coupling a read/write head to a driver circuit also includes a further step of linking the opposing flexible printed circuit terminals with a capacitor in order to minimize DC current loss.

According to yet another aspect of the invention, an impedance-controlled write driver circuit is provided, in which a write head is operably coupled to a flexible printed circuit having two opposing terminals for external coupling. Each of a symmetrical pair of matched impedance control circuits is coupled between an opposing terminal of the flexible printed circuit and a write driver circuit ground.

According to still another aspect of the invention, an impedance-controlled write driver circuit is configured such that the head voltage $V_h$ may be described by the formula, $V_h = I_w * (R_h + R_{fpc} + R_o) \div (R_h + R_{fpc})$, wherein: $I_W$ represents a write head current; $R_h$ represents a write head resistance; $R_{fpc}$ represents the resistance of the flexible printed circuit; and $R_o$ represents a selected internal reference resistance.

Preferred embodiments of the invention are described in which an impedance-controlled write driver circuit includes two matched impedance control circuits, each having a resistance value of about $R_o/2$.

The invention provides technical advantages including but not limited to providing accurate and operation without a reduction in the headroom of the write driver. The AC-coupled impedance control circuit of the invention does not influence the DC write current, so the write current is determined solely by the current source setting. The symmetrical circuit configuration provides a symmetrical head voltage swing, which minimizes damage to MR heads in the event of the application of excess voltage. These and other features, advantages, and benefits of the present invention will become apparent to one of ordinary skill in the art upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the figures unless otherwise noted. Like numerals refer to like parts throughout the various figures. Descriptive and directional terms used in the written description such as first, second, left, right, etc., refer to the drawings themselves as laid out on the paper and not to physical limitations of the invention unless specifically noted. The drawings are not to scale, and some features of embodiments shown and discussed may be simplified or amplified for illustrating the principles, features, and advantages of the invention.

DETAILED DESCRIPTION OF PREFERRED EMBODIMENTS

Figure 1:
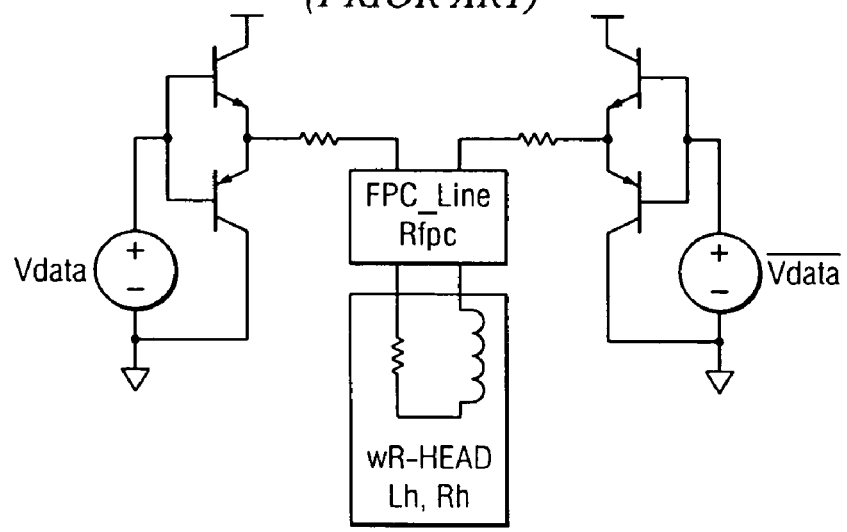
FIG. 1 (prior art) is a schematic block diagram showing an example of a write driver architecture known in the arts.
Figure 2:
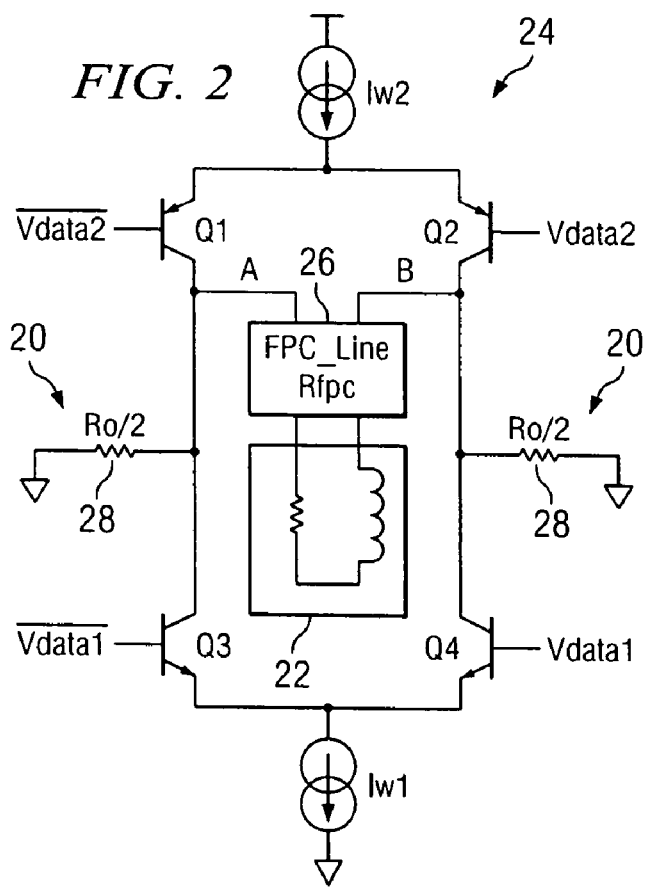
FIG. 2 is a schematic block diagram showing an example of a preferred embodiment of the invention.

An example of the impedance control circuit architecture for implementing the invention is shown in FIG. 2. In this preferred embodiment, impedance control circuitry 20 is shown. The write head 22 is connected to associated preamp circuitry 24 via a flexible printed circuit 26 including two write lines. Data input ports, typically transistors represented by Q1, Q2, Q3, and Q4, are provided for switching writing functions at the head 22 as familiar to those skilled in the arts. The impedance control circuitry 20 is preferably included as a portion of the preamp 24 circuitry. It should be understood that the impedance control circuitry 20 is seen in parallel from the point of view of the head 22.

Various configurations of impedance control circuitry 20 may be used within the concept and principles of the architecture of the invention, the methods and apparatus of which is represented in FIG. 2. According to the preferred embodiments of the invention, as long as the configuration of the impedance control circuitry 20 ensures that symmetry is maintained between the swing voltages of the lines of the FPC 26, the voltage of each write line is maintained as the polar opposite of that of the read line at any given moment. In this way the potential for damage to the head 22 by voltage swings is minimized or altogether avoided. Additionally, the parallel impedance control circuit 20 configuration significantly avoids reduction of the headroom of the driver circuit 24.

The write driver circuit referred to in FIG. 2 is shown in an implementation wherein each of two matched impedance control circuits 20 is provided in a configuration including a resistor 28 having a resistance value of about $R_0/2$ relative to the internal reference resistance $R_0$ of the write head 22. The resistors 28 are preferably matched in resistance value as closely as feasible and are electrically coupled respectively between nodes A and B of FIG. 2 and ground. Thus, the relationship of the write head 22 voltage $H_V$ to the write current $W_I$ may be described by the relationship, $V_h = I_W * (R_h + R_{fpc} + R_o) \div (R_h + R_{fpc})$. Although variations in the arrangement of the circuit are possible, a circuit topology described by this equation will not depart from the principles of the invention.

Figure 3:
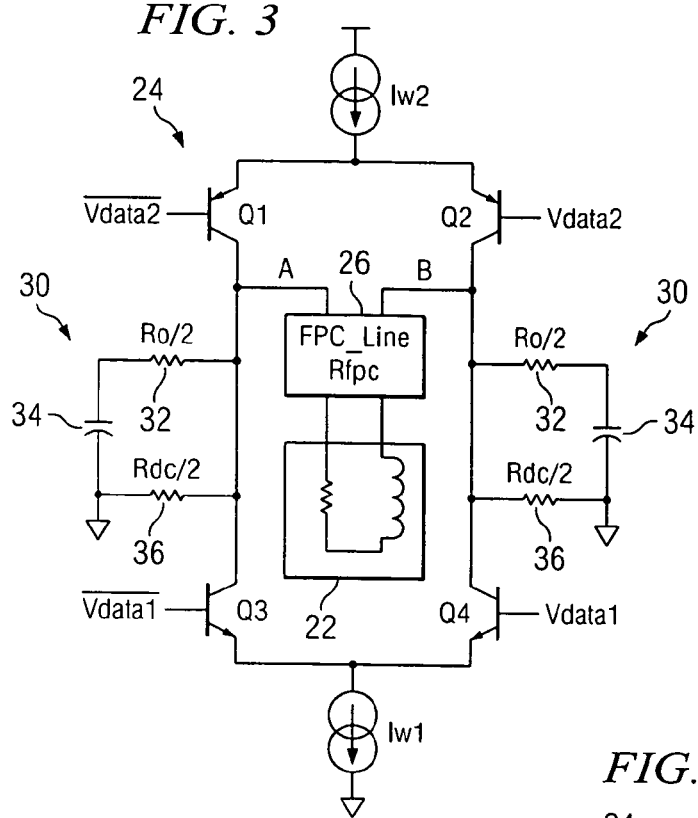
FIG. 3 is a schematic block diagram showing an example of an alternative preferred embodiment of the invention.

Now referring primarily to FIG. 3, a schematic diagram of an example of an alternative preferred embodiment of a write driver circuit 24 with an impedance control circuit 30 according to the invention is depicted. In this alternative embodiment, for each of the matched circuits 30, a first resistor 32 having a resistance value of about $R_o/2$ is electrically coupled to the first terminal of a capacitor 34. The second terminal of the capacitor 34 is coupled to a second resistor 36. The second resistor 36 has a resistance value of approximately $R_{dc}/2$, where $R_{dc}$ represents the DC resistance of the write head 22. The second terminal of the capacitor 34 is coupled to ground. Each of the impedance control circuits 30, with components preferably matched as closely as feasible, is coupled respectively to nodes A and B.

Figure 4:
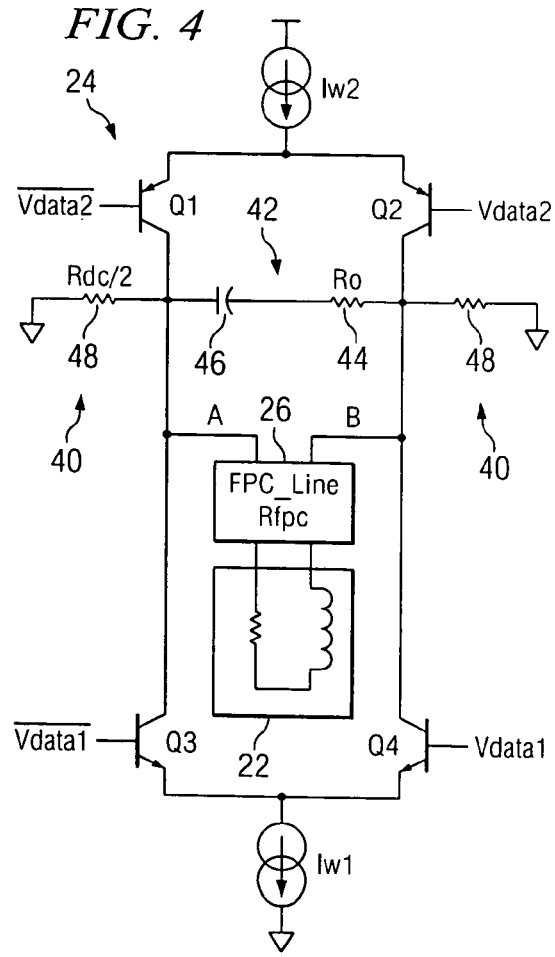
FIG. 4 is a schematic block diagram showing an example of another alternative preferred embodiment of the invention.

With reference primarily to FIG. 4, a schematic diagram of an example of another alternative preferred embodiment of an impedance control circuit 40 according to the invention is shown. In this alternative configuration 40 an electrical path 42 between the two FPC terminals A and B is provided. In this path 42, a first resistor 44, having a resistance value of about $R_o$, is connected in series with a capacitor 46. Of course these components 44, 46 could be reversed from the configuration shown 40 without departure from the invention. A second resistor 48 preferably having a resistance value of about $R_{dc}/2$ is electrically coupled between each of nodes A and B and ground. As with the other alternative embodiments, the second resistors 48 are preferably matched as closely as feasible in terms of resistance values.

Figure 5:
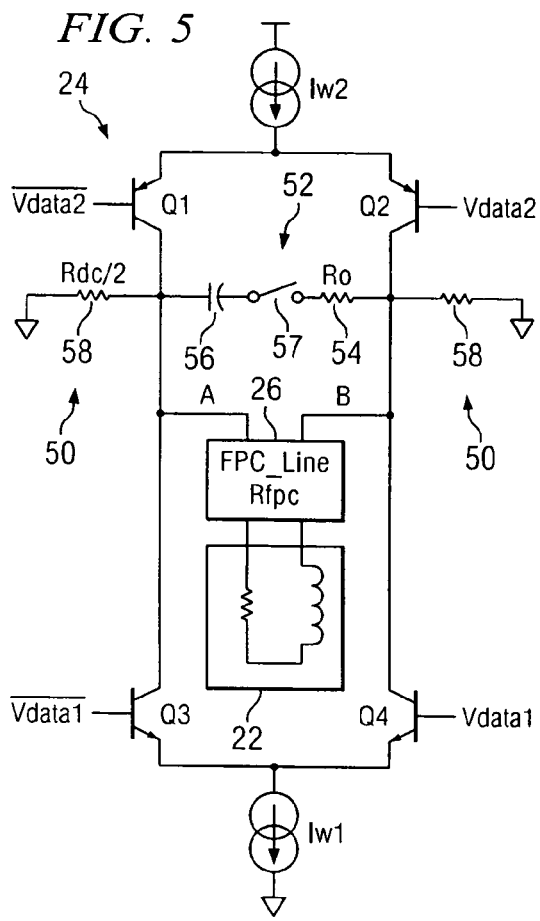
FIG. 5 is a schematic block diagram showing an example of another alternative preferred embodiment of the invention.

An additional alternative embodiment of a write driver circuit 24 using an impedance control circuit 50 according to the invention is shown in FIG. 5. As shown, in this additional alternative configuration 50 an electrical path 52 between the two FPC terminals A and B is provided. In this path 52, a first resistor 54, having a resistance value of about $R_o$, is connected in series with a capacitor 56. As shown, a switch 57 may be placed between the first resistor 54 and the capacitor 56. This switch 57 is preferably placed in the "on" position to allow the first resistor 54 and capacitor 56 to set impedance matching. The switch 57 is preferably placed in the "off" position when the voltage is in transition, i.e., from high to low, or from low to high, allowing faster rise times. A second resistor 58 preferably having a resistance value of about $R_{dc}/2$ is electrically coupled between each of nodes A and B and ground. As with the other alternative embodiments, the second resistors 58 are preferably matched as closely as feasible in terms of resistance values.

Figure 6:
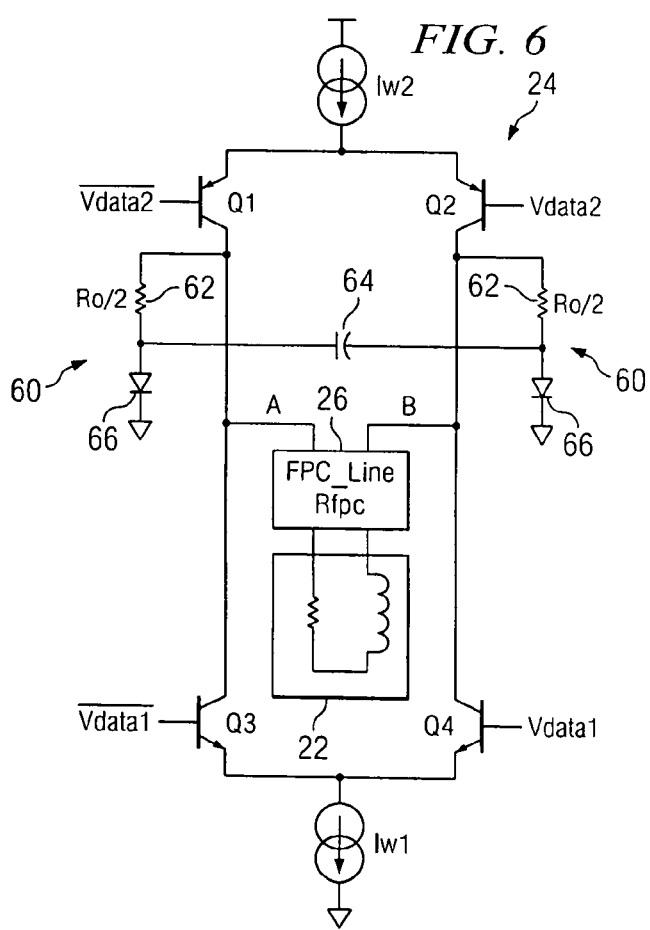
FIG. 6 is a schematic block diagram showing an example of another alternative preferred embodiment of the invention.

An alternative embodiment shown in FIG. 6 illustrates a schematic diagram of an example of another alternative preferred embodiment of an impedance control circuit 60 according to the invention. A first resistor 62 is coupled between nodes A and B and the opposing terminals of a capacitor 64. The resistors 62 preferably each have a resistance value of about $R_o/2$, and are as closely matched as feasible. Coupled between the junction of each resistor 62 with the respective terminals of the capacitor 64 and ground, matching diodes 66 are provided as shown.

Thus, the invention provides impedance-controlled write driver circuits and methods for low-power applications in which there is not significant headroom loss due to mismatching resistors. The invention also ensures that write head impedance is independent of write current, and that head voltage swing symmetry is maintained. The symmetrical head voltage swing minimizes damage to MR heads in the event of the application of excess voltage. While the invention has been described with reference to certain illustrative embodiments, the description of the methods and devices described are not intended to be construed in a limiting sense. Various modifications and combinations of the illustrative embodiments as well as other advantages and embodiments of the invention will be apparent to persons skilled in the art upon reference to the description and claims.

We claim:

1. A method of coupling a read/write head to a driver circuit having a current source, the method comprising the steps of:

operably coupling a read/write head to a flexible printed circuit, the flexible printed circuit having two opposing terminals for external coupling;

operably coupling a first impedance control circuit in parallel with the current source and a terminal of the flexible printed circuit; and operably coupling a second impedance control circuit in parallel with the current source and the opposing terminal of the flexible printed circuit;

wherein the first impedance control circuit and the second impedance control circuit are approximately matched in impedance, and a step of linking the opposing terminals with a capacitor for minimizing DC current loss.

2. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground;

two differential pair circuits, each coupled between the two opposing terminals; and wherein a head voltage $V_h$ is described by the formula;

$$V_h = I_W * (R_h + R_{fpc}) * R_o / (R_o + R_h + R_{fpc}), \text{ wherein}$$

$I_W$ represents a write head current;

$R_h$ represents a write head resistance;

$R_{fpc}$ represents the resistance of the flexible printed circuit; and $R_o$ represents a selected internal reference resistance.

3. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground;

two differential pair circuits, each coupled between the two opposing terminals; and wherein the matched impedance control circuits each further comprise a resistor having a resistance value of about $R_o/2$, wherein $R_o$ represents a selected internal reference resistance.

4. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground, wherein the matched impedance control circuits each further comprise:

a first resistor having a resistance value of about $R_o/2$ coupled to a first terminal of a capacitor, the capacitor having a second terminal coupled to ground;

a second resistor coupled to the second terminal of the capacitor in parallel with the first resistor, the second resistor having a resistance value of about $R_{dc}/2$; wherein $R_o$ represents a selected internal reference resistance; and $R_{dc}$ represents a DC resistance.

5. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground; and a first resistor, having a resistance value of about $R_o$ in series with a capacitor, coupled between the two FPC terminals;

wherein the matched impedance control circuits each further comprise a second resistor having a resistance value of about $R_{dc}/2$; wherein $R_o$ represents a selected internal reference resistance; and $R_{dc}$ represents a DC resistance of the impedance control circuit.

6. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground; and a first resistor, having a resistance value of about $R_o$ in series with a capacitor, coupled between the two FPC terminals, the path between the first resistor and capacitor further comprising a switch;

wherein the matched impedance control circuits each further comprise a second resistor having a resistance value of about $R_{dc}/2$; wherein $R_o$ represents a selected internal reference resistance; and $R_{dc}$ represents a DC resistance of the impedance control circuit.

7. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground; and a capacitor, coupled between the two flexible printed circuit terminals;

wherein the matched impedance control circuits each further comprise a resistor having a resistance value of about $R_o/2$, and having a first terminal coupled to a flexible printed circuit terminal, the resistor also having a second terminal coupled to the capacitor, wherein $R_o$ represents a selected internal reference resistance; and a diode coupled between the second terminal of the resistor and ground.

8. An impedance-controlled write driver circuit comprising:

a write head operably coupled to a flexible printed circuit, the flexible printed circuit having two opposing terminals for external coupling;

a symmetrical pair of matched impedance control circuits, each coupled between an opposing terminal of the flexible printed circuit and a write driver circuit ground; and two differential pair circuits, each coupled between the two opposing terminals.

* * * * *